United States Patent

Haarmann et al.

[11] Patent Number: 4,705,489
[45] Date of Patent: Nov. 10, 1987

[54] CONSTANT ANGLE SHAFT COUPLING

[75] Inventors: Walter Haarmann; Hans-Joachim Bremer, both of Wolfenbuttel, Fed. Rep. of Germany.

[73] Assignee: Barry Wright Corporation, Newton Lower Falls, Mass.

[21] Appl. No.: 651,183

[22] Filed: Sep. 14, 1984

[30] Foreign Application Priority Data

Sep. 15, 1983 [DE] Fed. Rep. of Germany ....... 3337714

[51] Int. Cl.[4] .............................................. F16D 3/04
[52] U.S. Cl. ...................................... 464/69; 464/81; 464/102
[58] Field of Search .................. 464/69, 81, 102, 137, 464/138, 147

[56] References Cited

U.S. PATENT DOCUMENTS 2,551,837  5/1951  Holloway ............................ 464/69
3,664,153  5/1972  Sugahara ............................ 464/69
3,972,205  8/1976  Schmidt .............................. 464/69

Primary Examiner—Daniel P. Stodola
Attorney, Agent, or Firm—Milton E. Gilbert

[57] ABSTRACT

A shaft coupling working on the principle of an Oldham's coupling in which rotary members are connected by pairs of guide links (20,26). Additional guide links (28,38), displaced at an angle of 90° to one another, are provided between the first rotary member (14) and the intermediate member (16) and between the intermediate member (16) and the second rotary member (18). The pivotal axes of the additional guide links extend in a crossed direction to the rotational axis of these members. These additional guide links provide resistance against axial forces in the coupling but do permit the coupling to operate with radial misalignment of the input and output shaft.

10 Claims, 9 Drawing Figures

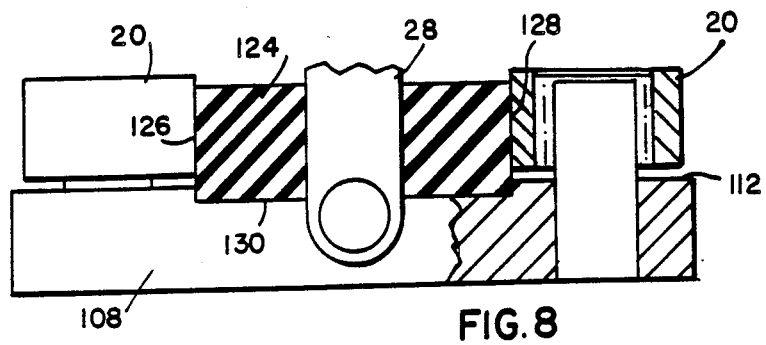
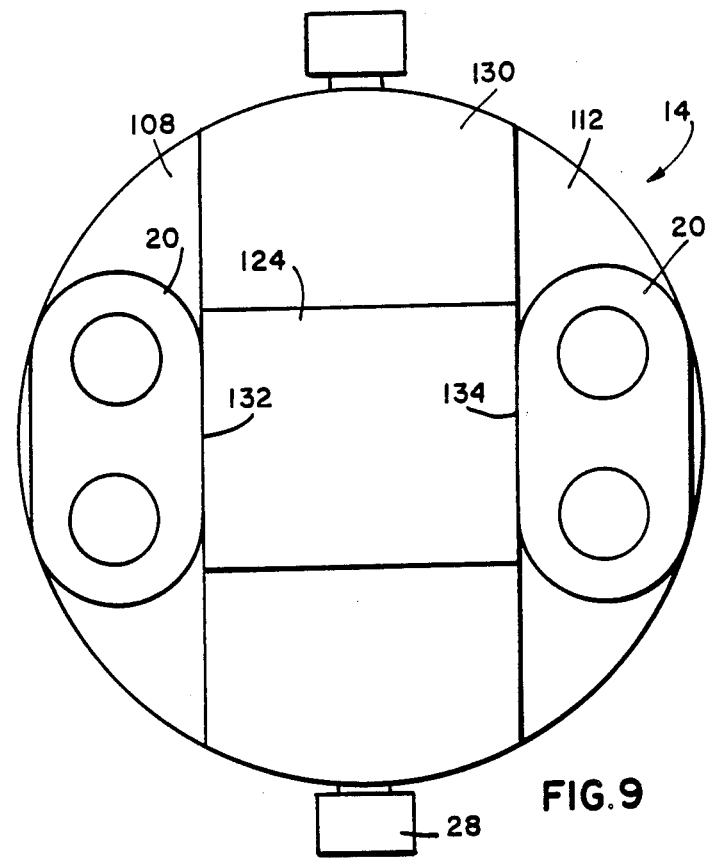

CONSTANT ANGLE SHAFT COUPLING

The present invention relates to constant-angle shaft couplings of the type which permit some radial-misalignment of input and output shafts, comprising: (a) a first outer rotary member, (b) an intermediate member, (c) a first pair of guide links which are pivotally connected at one end to the first rotary member and at the other end to the intermediate member, (d) a second outer rotary member, and (e) a second pair of guide links pivotally connected between the intermediate member and the second outer rotary member at a position circumferentially displaced by 90° from said first pair of guide links, the pivotal axes being parallel to the shaft axis.

Such shaft couplings work on the principle of the Oldham coupling. The intermediate member is maintained parallel to the first outer rotary member by the first pair of guide links but can move in a first direction relative to the first outer rotary member. The second outer rotary member is also maintained parallel to the intermediate member by the second pair of guide links. It can, however, move in a second direction, perpendicular to the first direction, relative to the intermediate member. Thus, radial-misalignment of the first and second outer rotary members is possible in any radial direction while preserving a constant angular relationship between the input and output shafts. This type of coupling provides the advantage of efficient performance with constant-angle coupling.

An example of such a coupling can be seen in German patent publication DE-OS No. 31 51 401 in which the guide links are positioned on axial pivots of the outer rotary members and the intermediate member, respectively. The device can thus transfer torque, which is a circumferential force, but cannot function under any axial forces, particularly in tension.

Solutions for obviating the effect of axial forces have been proposed and reference may be made to German patent Publication DE-OS No. 29 33 722 but the solution there proposed leads to various structural problems. The present invention provides a shaft coupling of the type first mentioned constructed so that axial forces, particularly forces in tension, can be handled without disturbing the normal function of the shaft coupling. According to the present invention this is achieved by providing:

(f) at least one further guide link pivotally connected between the first rotary member and the intermediate member with axes of pivotal connection which extend perpendicularly to the planes defined by the pivotal axes of the first pair of guide links, and (g) at least one further guide link pivotally connected between the intermediate member and the second outer rotary member having pivotal axis extending perpendicularly to the planes defined by the axes of rotation of the second pair of guide links.

Axial forces received by the connecting guide links can be transferred by them without distortion through their pivot points. At the same time, the connecting guide links permit relative movement between the first outer rotary member and the intermediate member and between the intermediate member and the second outer rotary member in directions perpendicular to each other.

Details of the invention are found in the sub-claims.

The invention will become apparent from the following description of preferred embodiments of the invention considered in conjunction with the accompanying drawings in which:

FIG. 8 is a top view, shown partially in section, of a further embodiment of the shaft coupling; and FIG. 9 is an end view of the coupling shown in FIG. 8.

Figure 1:
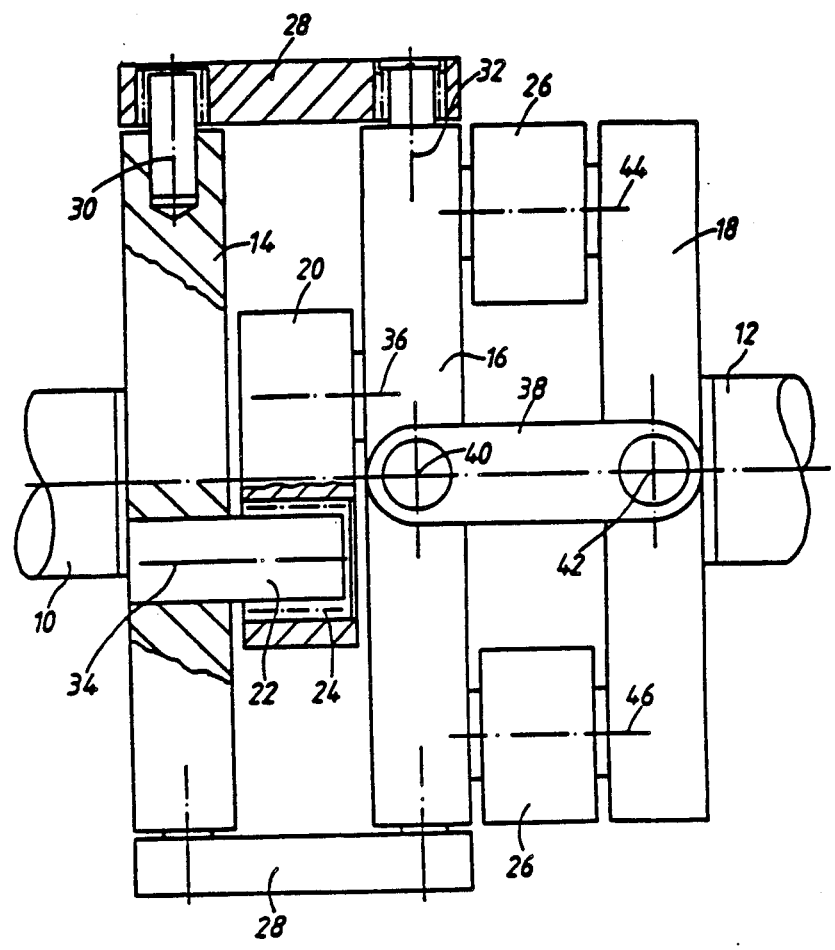
FIG. 1 is a side view, partially in section, of a coupling of the invention.

The coupling shown in FIG. 1 maintains a constant angular relationship between rotatable shafts 10 and 12 while permitting radial misalignment of the shafts. The coupling has a first outer rotary member 14 coupled to shaft 10, a floating intermediate member 16 and a second outer rotary member 18 coupled with shaft 12. A first pair of guide links or rods 20, of which only one is shown in FIG. 1, is connected between rotary member 14 and intermediate member 16. One end of guide link 20 is pivotally connected by means of a roller bearing 24 to a pin 22 rigidly connected to first rotary member 14. The other end of guide link 20 is correspondingly pivotally connected to intermediate member 16. The coupling between intermediate member 16 and the second rotary member 18 is similarly provided by a pair of parallel guide links or rods 26 at positions which are displaced circumferentially 90° from the position of guide links 20.

The elements of the coupling so far described permit a limited amount of misalignment between shafts 10 and 12. If, for example, shaft 10 were held fixed then shaft 12 can move parallel to itself in all directions. Upward movement of shaft 12 occurs because of pivotal motion of links 26 whereas sideways motion of shaft 12, that is out of the plane of the paper, is accomplished by pivotal motion of guide links 20 with the intermediate member having a corresponding displacement. It will be recognized that this type of movement does not involve rotary motion of shaft 12 and, accordingly, the coupling provides a constant angular relationship between the input shaft and the output shaft while permitting some misalignment of the shafts. This function is present even when shafts 10 and 12 are left free for movement and not with one shaft fixed as described in the above example. It is known, however, that the coupling so far described is not resistant to axial forces especially such axial tractive forces as would remove pin 22 from bearing 24.

In order to make the coupling resistant to axial tractive forces at least one further guide link 28 is provided pivotally mounted between the first rotary member 14 and the intermediate member 16 on pivotal axes 30 and 32. Pivotal axes 30 and 32 are perpendicular to the planes defined by the pivotal axes 34 and 36 of guide links 20. Referring to the orientation of the coupling shown in FIG. 1, axes 30 and 32 lie in the plane of the paper and this plane intersects at right angles planes defined by the axes 36 and the axes 34 of the pair of guide links 20.

A similar guide link 38 is provided between the intermediate coupling member 16 and the outer rotary member 18 pivotally mounted on axes 40 and 42. These axes intersect at right angles the plane defined by pivotal axes 44 and 46 of links 26 which, in FIG. 1, is the plane of the paper. Axes 40 and 42 are perpendicular to the plane of the paper. When axial forces are applied to the coupling, for example, by holding shaft 10 and pulling on shaft 12, this force is taken up by guide links 28 and 38 with their bearings being stressed transversely to their pivotal axes 30, 32 and 40, 42. Thus, the coupling continues to function under such tension.

FIG. 1 shows two guide links 28 positioned between the first outer rotary member 14 and the intermediate member 16. Similarly between intermediate members 16 and the second outer rotary member 18 two guide links 38 are provided although only one is shown in FIG. 1.

Figures 2, 3:
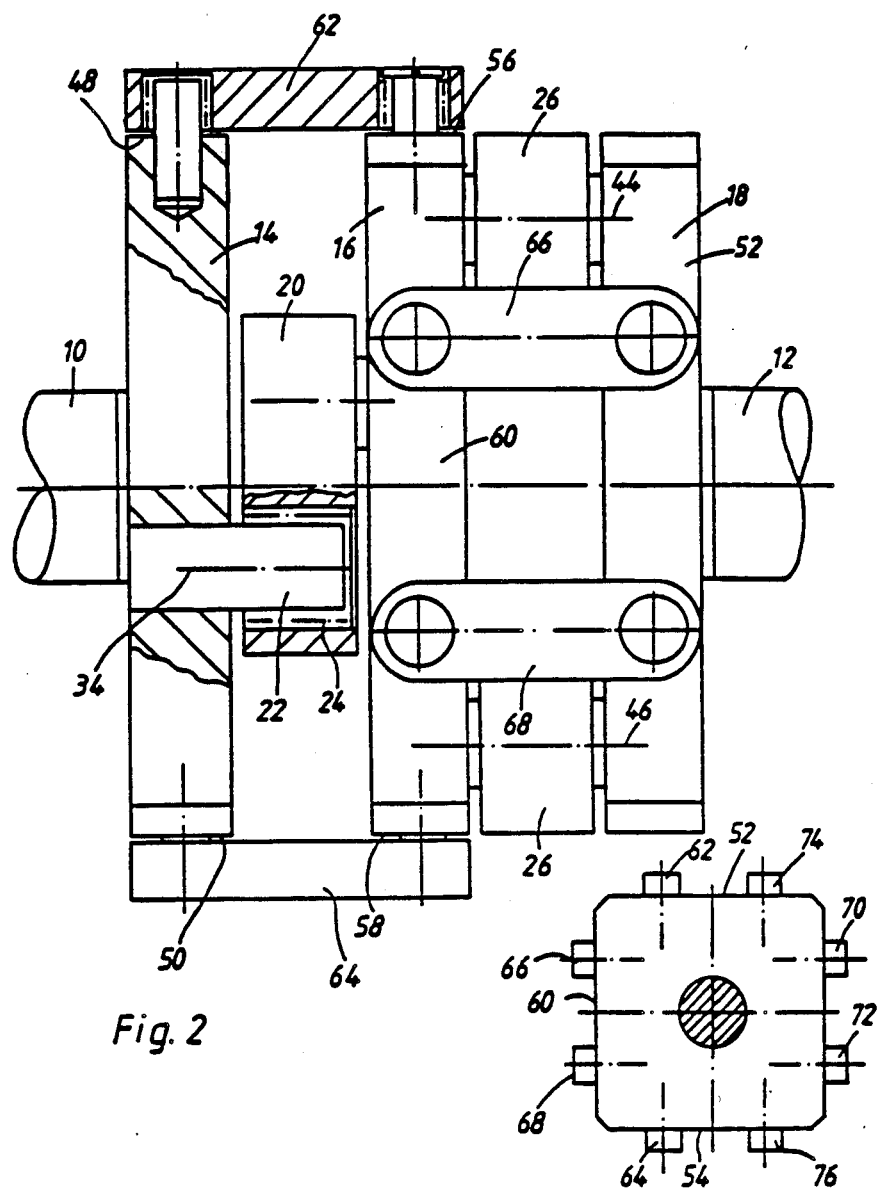
FIG. 2 is a view similar to FIG. 1 of another embodiment of the invention.
FIG. 3 is an end view of the coupling shown in FIG. 2.

The coupling shown in FIGS. 2 and 3 is similar to that shown in FIG. 1 and the same reference numerals are used for corresponding parts. The outer coupling portions 14 and 18 are formed with flat surfaces as is the intermediate member 16. Thus, as seen in FIG. 3 the coupling is essentially of square section. Specifically, the first rotary member 14 has flat surfaces 48 and 50 and the second rotary member 18 has flat surfaces 52 and 54. The various pivot axes 34, 44 and 46 of the links 20 and 26 define planes parallel to these surfaces. Similarly, the intermediate member 16 has four flat surfaces; namely, surfaces 56 and 58 parallel to axes 34 and two flat surfaces on the other sides parallel to axes 44 and 45. Only the flat surface 60 is shown in FIG. 2. The flat surfaces of the various members are essentially co-planar, for example, surfaces 48 and 56 of first rotary member 14 and intermediate member 16 are co-planar and the flat surface 60 of intermediate member 16 and surface 52 of the second rotary member 18 are co-planar. The first rotary member 14 and the intermediate member 16 are linked by pairs of parallel guide links pivoted on corresponding flat surfaces 48 and 56 and 50 and 58, respectively. In FIG. 2 only one guide link of each pair 62 and 64 can be seen.

Similarly, the intermediate member 16 and the second rotary member 18 are linked by pairs of parallel guide links pivotally received on adjacent flat surfaces 60 and 52, respectively, of which only guide links 66 and 68 can be seen in FIG. 2. As can be seen in FIG. 3, guide links 66 and 68 have at the opposite side similar guide links 70 and 72. Guide links 74 and 76 can be seen in FIG. 3 which lie behind guide links 62 and 64 as seen in FIG. 2. As previously pointed out it can be seen that the coupling formed from the first outer rotary member, the intermediate member and the second rotary member is an essentially square element.

Figure 4:
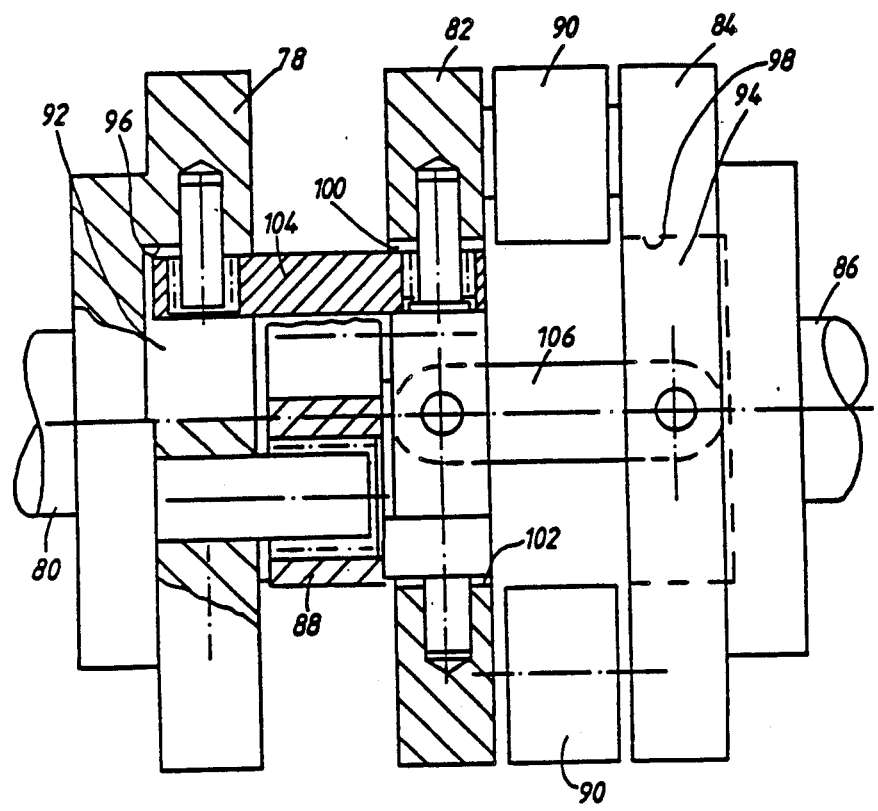
FIG. 4 is a view similar to FIG. 1 of a third embodiment of the invention.

FIG. 4 shows a coupling in which the first rotary member 78 is coupled to a shaft 80, an intermediate member 82 is provided and the second outer rotary member 84 is coupled to a shaft 86. The first rotary member is coupled to the intermediate member by a pair of guide links 88 in the manner already described. The intermediate member is, in turn, coupled to the second rotary member by means of parallel guide links 90 displaced 90° in a circumferential direction.

In the embodiment of FIG. 4 the input and output members 78 and 84 have central recesses 92 and 94. These recesses define interior surfaces having a circumference shown at 96 and 98. The intermediate member is of ring shape with a central hole 100 defining an interior surface 102. Guide links 104 and 106 are pivotally mounted on the interior surfaces 96 and 102, and 102 and 98, respectively, of the first and second rotary members 78 and 84 and the intermediate member 82.

Figure 5:
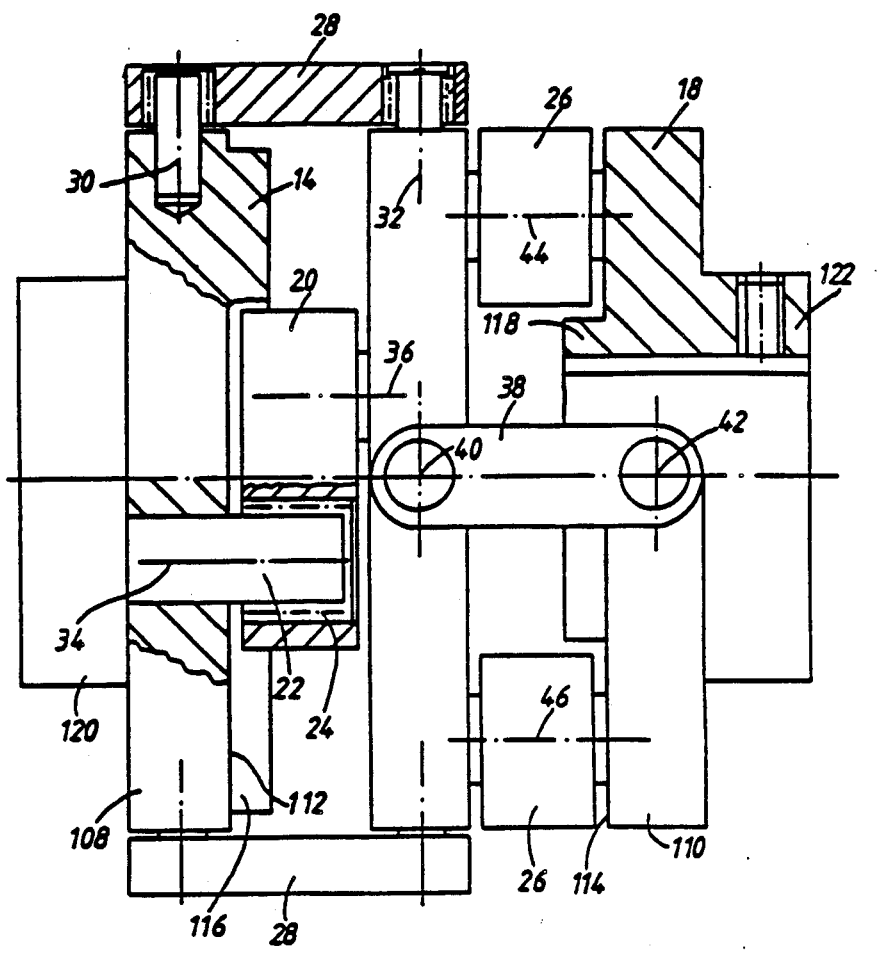
FIG. 5 is a view similar to FIG. 1 of another embodiment of the invention.

The shaft coupling shown in FIG. 5 contains elements similar to those described in connection with FIG. 1 and they bear the same reference numbers. In the embodiment according to FIGS. 5, 6 and 7 the first and second rotary members 14 and 18 have flat disk portions 108 and 110 which define end surfaces 112 and 114 having diametrical projecting ridges 116 and 118 therebetween. As best seen in FIG. 7 the first and second pairs of guide links 20 and 26 are pivotally attached to the flat surfaces symmetrically on either side of ridges 116 and 118. These ridges 116 and 118 are arranged at right angles to one another and form stops to limit the amount of deflection of guide links 20 and 26. As seen in FIG. 5 both of the first and second rotary members 14 and 18 are formed with hubs 120 and 122 for connection to the shaft ends.

Figure 6:
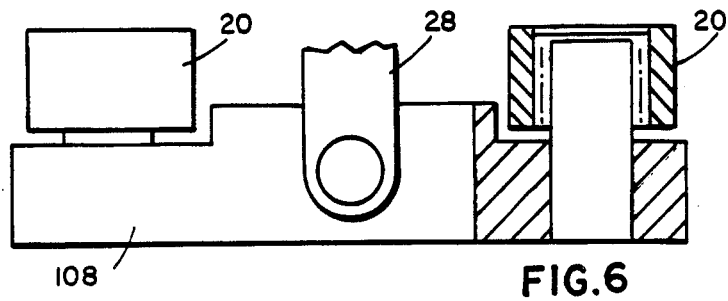
FIG. 6 is a top view of a portion of the coupling shown in FIG. 5.
Figure 7:
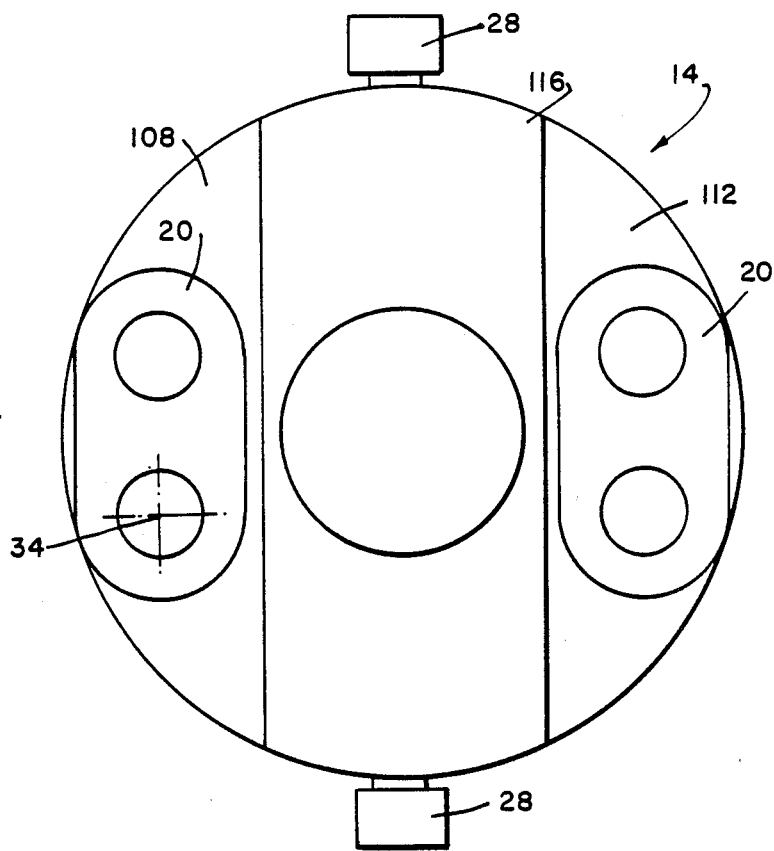
FIG. 7 is an end view of the portion of the coupling shown in FIG. 6.

The embodiment shown in FIGS. 8 and 9 is similar to the embodiment described in regard to FIGS. 5 to 7 and corresponding portions are given the same reference numerals. In the embodiment shown in FIGS. 8 and 9 the first rotary member 14 and the second rotary member 18 are each provided with an elastic rubber body 124 extending between the guide links 20. Body 124 has lateral faces 126 and 128 abutting on the radial interior surfaces of the guide links 20 and 26. The first and second rotary members each have flat disk portions 108 defining an end surface 112 and a recessed portion 130. The elastic body 124 is held in recess 130 with its upper portion projecting out of the recess.

Each pair of guide links 20 and 26 are mounted symmetrically on either side of the recess in input member 14 and output member 18. These guide links have their lateral surfaces 132 and 134 facing inwardly and abutting lateral surfaces 126 and 128 of the elastic body 124. The first rotary rember 10 and the second rotary member 14 are arranged so that the recesses extend at right angles to one another. In the arrangement shown in FIGS. 5 to 7 the displacement of the guide links 20 and 26 is limited by the configuration of the input and output members whereas in the embodiment of FIGS. 8 and 9 the displacement is limited elastically. Both avoid dislocation of the guide links due to undue movement.

We claim:

1. A constant angle shaft coupling, comprising:
   (a) a first outer rotary member adapted for connection to a first shaft rotatable about a first axis;
   (b) an intermediate member;
   (c) a first pair of guide links pivotally connected at one end to the first outer rotary member and at the other end to the intermediate member, and having pivotal axes parallel to the first shaft axis;
   (d) a second outer rotary member adapted for connection to a second shaft rotatable about a second axis;
   (e) a second pair of guide links pivotally connected between the intermediate member and the second outer rotary member at a position circumferentially displaced by 90° from the first pair of guide links, and having pivotal axes parallel to the second shaft axis;
   (f) a third pair of guide links pivotally connected between the first rotary member and the intermediate member, and having pivotal axes extending perpendicularly to the planes defined by the pivotal axes of the first pair of guide links; and (g) a fourth pair of guide links pivotally connected between the intermediate member and the second outer rotary member at a position circumferentially displaced by 90° from the third pair of guide links, and having piovtal axes extending perpendicularly to the planes defined by the pivotal axes of the second pair of guide links.

2. The coupling of claim 1 wherein the first and second outer rotary members and the intermediate member are each formed with flat surfaces on opposite sides parallel to the planes defined by the pivotal axes of the first and second pairs of guide links; and the third and fourth pairs of guide links are pivotally mounted on the flat surfaces.

3. The coupling of claim 2 wherein each of the flat surfaces of the first outer rotary member is linked to a corresponding one of the flat surfaces of the intermediate member by at least two guide links including one guide link of the third pair of guide links, and each of the flat surfaces of the second outer rotary member is linked to a corresponding one of the flat surfaces of the intermediate member by at least two guide links including one guide link of the fourth pair of guide links.

4. The coupling of claim 3 wherein the first and second outer rotary members and the intermediate member are of substantially square section.

5. The coupling of claim 1, wherein:
(a) the first and second outer rotary members have central recesses defining interior surfaces;
(b) the intermediate member is of ring-shape with a central opening defining an interior surface; and
(c) the third and fourth pairs of guide links are pivotally mounted on the interior surfaces of the first and second rotary members and the intermediate member.

6. The coupling of claim 1, wherein:
(a) the first and second rotary members have flat disk portions with a projecting ridge extending diametrically across the inward face of the respective member;
(b) the first and second pairs of guide links are pivotally mounted symmetrically on both sides of the ridges on the first and second outer rotary members, respectively; and
(c) the ridges of the first and second outer rotary members are arranged at right angles to each other, whereby the ridges form steps for the first and second pairs of guide links and limit their lateral deflection.

7. The coupling of claim 1, further comprising an elastic body fitted between each guide link of the first and second pairs of guide links and the respective member of the first and second outer rotary members, the side faces of the elastic body engaging the radially inward faces of the guide links.

8. The coupling of claim 7, wherein:
(a) the first and second outer rotary members each are formed as a disk having a recessed portiton extending diametrically across the front plane of the disk;
(b) the elastic body is of block-shape with its lower portion held in the recess and its upper portion projecting out of the recess;
(c) the first and second pairs of guide links are pivotally mounted symmetrically on either side of the first and second outer rotary members, respectively, with their inward faces engaging the side faces of the elastic body; and
(d) the recesses in the first and second outer rotary members extend at right angles to one another.

9. The coupling of claim 1 wherein the first and second outer rotary members and the intermediate member are each of substantially square section having flat surfaces, and are linked by respective third and fourth pairs of guide links pivoted on corresponding flat surfaces.

10. A constant angle shaft coupling, comprising:
(a) a first outer rotary member adapted for connection to a first shaft rotatable about a first axis;
(b) an intermediate member;
(c) a first pair of guide links pivotally connected at one end to the first outer rotary member and at the other end to the intermediate member, and having pivotal axes parallel to the first shaft axis;
(d) a second outer rotary member adapted for connection to a second shaft rotatable about a second axis;
(e) a second pair of guide links pivotally connected between the intermediate member and the second outer rotary member at a position circumferentially displaced by 90° from the first pair of guide links and having pivotal axes parallel to the second shaft axis;
(f) a third plurality of guide links pivotally connected between the first rotary member and the intermediate member, and having pivotal axes extending perpendicularly to the planes defined by the pivotal axes of the first pair of guide links;
(g) a fourth plurality of guide links pivotally connected between the intermediate member and the second outer rotary member, and having pivotal axes extending perpendicularly to the planes defined by the pivotal axes of the second pair of guide links; and
(h) wherein the first and second outer rotary members and the intermediate member are each formed with flat surfaces on opposite sides parallel to the plane defined by the pivotal axes of the first and second pairs of guide links; and the third and fourth pairs of guide links are respectively pivotally mounted on opposing flat surfaces.

* * * * *